United States Patent [19]

Merzon

[11] Patent Number: 5,246,284
[45] Date of Patent: Sep. 21, 1993

[54] STORAGE CABINET AND CABINET MODULE FOR SELECTIVELY STORING TAPE CASSETTES AND DISCS

[76] Inventor: Richard Merzon, 49-16 Maspeth Ave., Maspeth, N.Y. 11378

[21] Appl. No.: 822,934

[22] Filed: Jan. 21, 1992

[51] Int. Cl.⁵ .................................. A47B 87/00
[52] U.S. Cl. .................... 312/107; 312/111; 312/334.46
[58] Field of Search .......... 312/107, 111, 330.1, 312/334.1, 265.1, 265.2, 334.46, 334.47

[56] References Cited

U.S. PATENT DOCUMENTS

| | | | |
|---|---|---|---|
| 188,566 | 3/1877 | Barnes | 312/107 |
| 2,119,407 | 5/1938 | Weiskopf | 312/330.1 |
| 2,730,423 | 1/1956 | Mock | 312/334.46 |
| 3,238,001 | 3/1966 | Allen et al. | 312/107 |
| 3,552,817 | 1/1971 | Marcolongo | 312/107 |
| 3,639,028 | 2/1972 | Black | 312/334.46 |
| 4,202,586 | 5/1980 | Oplinger | 312/107 |
| 4,266,834 | 5/1981 | Ackeret | 312/111 |
| 4,592,601 | 6/1986 | Hlinsky et al. | 312/111 |
| 4,805,970 | 2/1989 | Scalf | 312/334.47 |

Primary Examiner—Victor N. Sakran
Attorney, Agent, or Firm—Robert W. Fiddler

[57] ABSTRACT

A storage cabinet construction providing a module subject to selective combination with other modules, to form the cabinet providing drawers for storing audio cassettes, compact discs, videocassettes and game cartridges. Each storage cabinet module is formed with a facade frame construction subject to ready plastic molding for securely engaging the top, bottom and side walls of the module, and formed with drawer guides and stops to facilitate slidable positioning, sure guidance and maintenance of drawers in the module. Interlocking tabs and recesses formed on the facade frame serve to implement the conjunction of the module with other modules to form a desired selectively expansible storage cabinet, combining modules with the same or differently dimensioned drawers to accomodate the cassettes, game cartridges and discs to be stored.

20 Claims, 2 Drawing Sheets

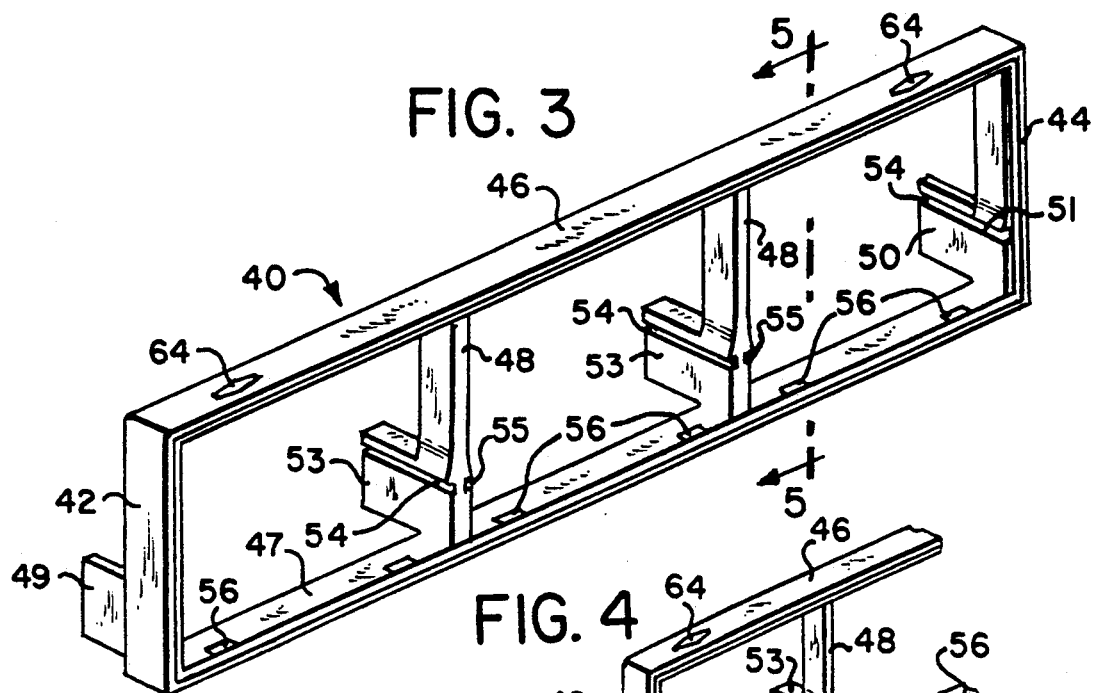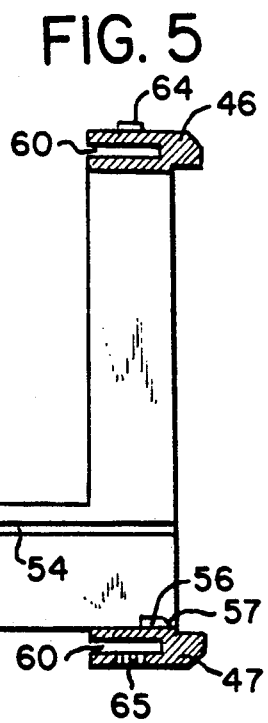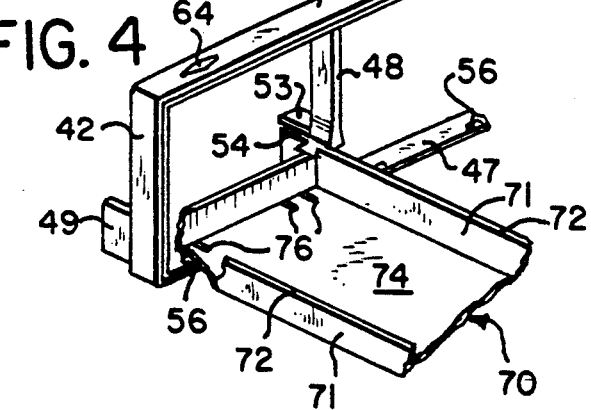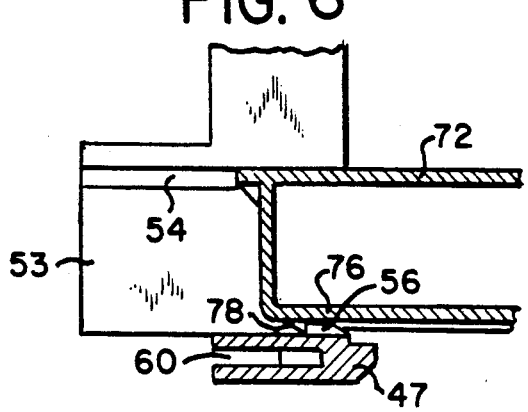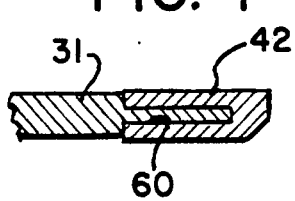

STORAGE CABINET AND CABINET MODULE FOR SELECTIVELY STORING TAPE CASSETTES AND DISCS

This invention relates to the art of storage cabinets, and more particularly, to a storage cabinet formed of one or more modules containing differently sized drawers for the selective storage of tape cassettes, compact discs, game cartridges or the like.

With the burgeoning home entertainment use of audio tapes, videotapes, compact discs and the like, the need has arisen for storage cabinets to contain such tape cassettes and discs. What has been happening is that with the advance of technology, the user finds that he or she owns a variety of these recordings of different types. Thus, the audiophile has a collection of tape cassettes, which in recent years has been augmented or substituted by compact discs. In addition, a large number of home entertainment centers are employing videotape cassettes. Users may thus find themselves with a collection of videotapes, audiotapes, compact discs and game cartridges, all of which are of a different size and which require storage in a position so that they will be readily accessible for use.

To this end, a variety of storage cabinets have been provided, many of which employ compartmented drawers for retaining the stored cassettes or tapes. Where separate cabinets are employed, the space requirements often become unwieldy.

Further, it is desirable to form these cabinets in a fashion subject to attaining a desired aesthetic appearance compatible with interior furnishing, and subject to being made relatively inexpensively, so that as the user's collection of discs and/or tapes increases, additional modules can readily be purchased and accomodated.

BRIEF DESCRIPTION OF THE INVENTION

It is with the above considerations in mind that the improved storage cabinet has been evolved providing a cabinet subject to selective expansion or contraction in size as required by the user facilitating the storage of differently sized recording media, such as audio tapes, videotapes, compact discs and the like.

It is accordingly one of the primary objects of this invention to provide an improved storage cabinet particuarly adapted for the storage of the same and differently dimensioned recording media.

Another object of the invention is to provide a storage cabinet which can be selectively expanded or reduced in size as required by the needs of the user.

A further object of the invention is to provide an improved drawer retaining module construction with the module subject to conjunction with like modules to form a storage cabinet.

An additional object of the invention is to provide a drawer retaining module in which drawers may be easily moved into and out of the module with sure guidance of the drawer, with the drawer subject to sure retention in the module.

These and other objects of the invention which will become hereafter apparent are achieved by forming a drawered module subject to combination with other modules to form the cabinet. Each module is formed with a facade frame subject to ready plastic molding. The facade frame is formed with separated end styles and intermediate partition styles defining drawer entry way openings, and the facade frame is provided with drawer guides in the form of slideways, and drawer stops. Additionally, the molded plastic frame is molded with mating projections and recesses so that the frame in position on the formed module is subject to interengagement with adjacent frames to provide an interlock between adjacent modules when stacked to form the cabinet.

A feature of the invention resides in the formation of a facade frame for use in forming a module, with the frame subject to ready plastic molding and providing drawer slides and stops for permitting ready retention of a drawer in the module to be formed.

Another feature of the invention resides in the combination of modules of equal horizontal area with each module divided into groups of drawers, the drawers of different modules having different sizes dimensioned to accomodate either audio or videocassettes, compact discs, game cartridges or the like.

The specific details of a preferred embodiment of the invention and their mode of functioning will be particularly pointed out in clear, concise and exact terms in conjunction with the accompanying drawings, wherein:

FIG. 3 is a perspective view of the front facade frame of the module shown in FIG. 2;

FIG. 4 is a perspective elevational view of a facade frame employed in forming the module of FIG. 2;

FIG. 5 is a cross-section detail of the left corner of the facade frame shown in FIG. 2.

FIG. 6 is a cross sectional detail illustrating the interlock of the drawer base with the frame drawer stop showing the interengagement of the drawer stop on the frame and the spring detent on the drawer base; and FIG. 7 is a cross-sectional detail through a style showing its engagement with a module sidewall.

DESCRIPTION OF PREFERRED EMBODIMENT

Figure 1:
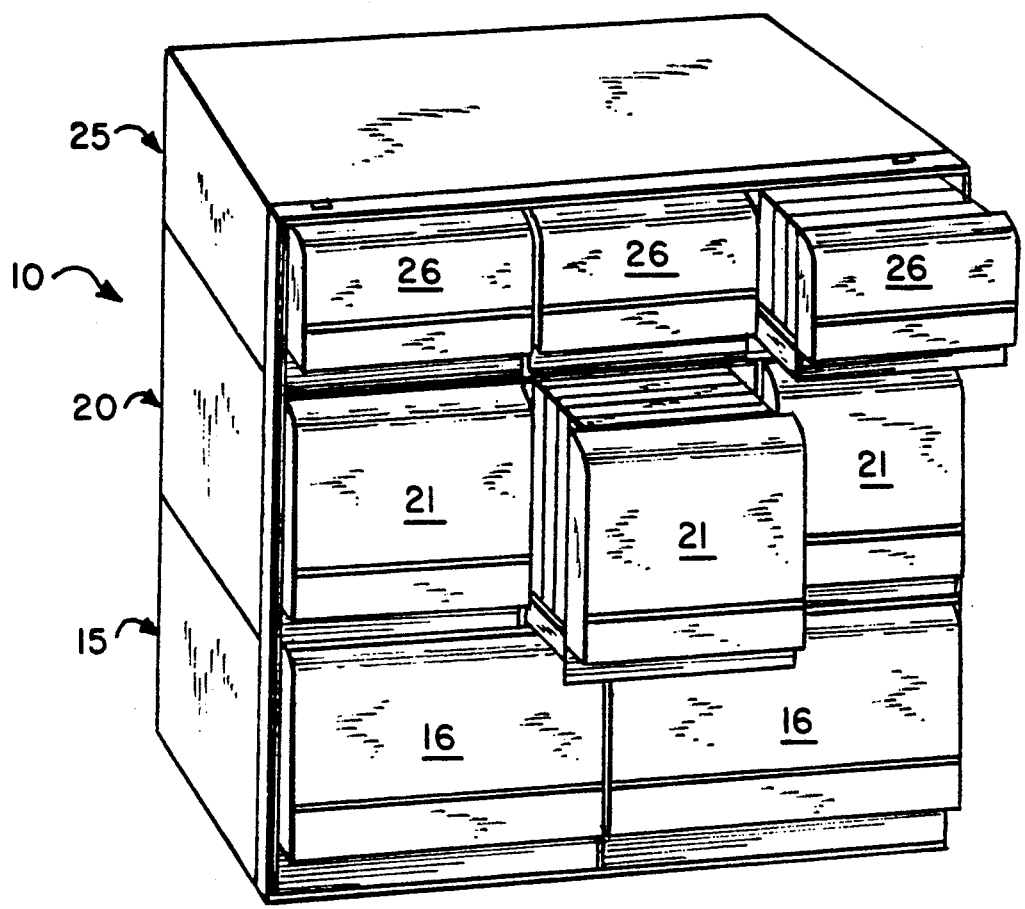
FIG. 1 is a front perspective elevational view of a storage cabinet formed, in accordance with the invention, of a plurality of modules here shown as dimensioned to accomodate drawers holding video cassettes in the lower module, compact discs in the next module level, and audio cassettes in the top level module.

Referring now more particularly to the drawings where like numerals will be employed to designate like parts, the cabinet 10 made in accordance with the teachings of the invention is illustratively shown in FIG. 1 as comprising a plurality of stacked modules 15, 20 and 25. In the illustrated embodiment, it will be noted that each of the modules 15, 20 and 25 have the same horizontal cross sectional area so that they may be stacked one on top of the other with their side, front and rear walls vertically aligned. The lower module 15 is illustratively shown as formed with drawers 16 having a larger dimension than the drawers 21 of module 20 which are in turn larger than the drawers 26 of module 25. In the illustrated embodiment, it is contemplated that the drawers 16 will be dimensioned to accomodate videotapes, while drawers 21 will accomodate compact discs, with the dimensioning of drawers 26 accomodating audio tape cassettes.

Figure 2:
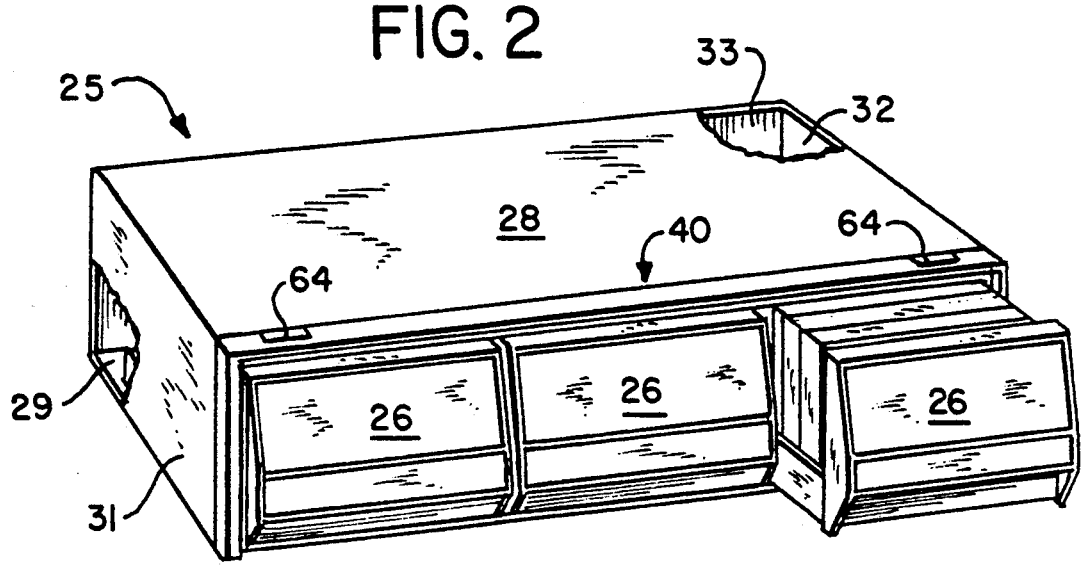
FIG. 2 is a perspective elevational view of an audio cassette module suitable for use in the cabinet shown in FIG. 1.

A three door module 25 is illustratively shown in FIG. 2 and is formed with a rectangular configuration having a top wall 28, bottom wall 29, spaced side walls 31 and 32, and a rear wall 33.

A facade frame 40, as best seen in FIG. 3, is provided, which serves to maintain the top, bottom and side walls of the module in position, and provide drawer guides including slideways and stops. The facade frame 40 is formed with a left-hand end style 42 spaced from a right-hand end style 44. End styles 42 and 44 are joined by an upper horizontally extending cross piece 46 spaced from a lower cross piece 47 to form a rectangular frame defining the dimensions of the front of the module 25. Intermediate styles 48 are provided to define the desired drawer openings, two intermediate styles 48 being employed in the illustrated embodiment to define the three drawer openings between end styles 42 and 44.

End styles 42 and 44 are formed with rearwardly extending projections 49 and 50 respectively, which are mirror images of each other. A slideway 51, as best seen to the right in FIG. 3 is formed in style 44, and extends into projection 50. A similar slideway is of course formed in style 42 extending into projection 49.

Intermediate styles 48 are formed with projections 53, and slideways 54 and 55 are formed on opposed sides of styles 48 extending rearwardly from the front of the facade frame as viewed in FIG. 3. On the upper interior surface of the lower cross piece 47 are one or more drawer stops 56, as best seen in FIGS. 3, 5 and 6. Stops 56 are formed with an upper ramped surface 57, as best seen in FIG. 5, downwardly inclined toward the front of the facade frame.

A channel groove 60 as best seen in FIGS. 5 and 6 is formed in cross pieces 46 and 47, as well as in styles 42 and 44, as illustratively shown in FIG. 7. Channel grooves 60 are dimensioned to accomodate the walls of the module 40, side wall 31 being shown illustratively in FIG. 7 embraced in channel groove 60 of style 42.

Projections 64 and mating recesses 65 as best seen in FIGS. 3 and 5 are formed on the cross pieces 46 and 47. In the illustrated embodiment, projection 64 is shown on the upper outer surface of upper cross piece 46, and the recess 65 is shown as formed on a lower cross piece 47. The positioning of these projections 64 and recesses 65 is such that when the modules 15, 20 and 25 are stacked as shown in FIG. 1, the projections 64 of one module will be engaged with the recesses 65 of an adjacent module. Though the projections and recesses are illustratively shown as arranged on the upper and lower cross pieces respectively of the facade frames, it will apparent to those skilled in the art that the recesses 65 may readily be formed in the upper cross piece and the projection 64 in the lower cross piece should this be desired.

The drawers are formed with drawer bottoms 70 illustratively shown in FIG. 4 having side flanges 71 with outwardly extending slides 72 on the lateral edges thereof. Slides 72 are dimensioned to ride freely with sure guidance in slideways 51, 54 and 55 as best seen in FIG. 4. The bottom wall 74 of the drawer bottom 70 is formed with spring tabs 76 having detents 78 at the end thereof, as best seen in FIG. 6, the dimensioning of detents 78 being such as to permit them to ride over stop 56 when the drawer is moved towards the rear of the module.

OPERATION

In use, the storage cabinet 10 as illustratively shown in FIG. 1 is described formed by combining a plurality of drawer containing modules, each having the same horizontal cross section, so that they may be stacked to form what looks like a unitary structure, with the front, side and back walls of each module vertically aligned.

The modules are formed utilizing a facade frame 40, as described and shown in FIG. 3. It is preferred that conventional plastic molding techniques be employed to form this facade frame 40, employing a mold in which the desired frame 40 with its end styles 42 and 44 interconnected by cross pieces 46 and 47 is formed as described with the intermediate styles 48, all as a unitary structure.

This molded plastic facade frame 40 can obviously be formed by a variety of techniques, though plastic molding is preferable. The formed facade frame secures the side, top and rear walls of the module, keeping the joining corners of the side wall in desired abutment, as for example shown in FIG. 2. It is preferred that the bottom wall 29, side wall 31, top wall 28 and side wall 32 be formed of a single sheet scored with a "V" groove and folded along the V groove into the illustrated rectangular configuration. The front end of the walls is reduced in dimension to form a tongue subject to insertion into the channel groove 60, as shown in FIG. 7, so that the facade frame 40 maintains the walls in desired orientation. Back wall 33 is then secured to the oriented side, top and bottom walls to form the module illustrated in FIG. 2.

It is preferred that the drawers be formed as described, preferably employing plastic molding techniques to provide the desired drawer bottom wall 74 having springs 76 and detents 78. The formed drawers are arranged in the openings between the styles with the drawer slides 72 engaged in the slideways 54 to orient and facilitate passage of the drawers into the module. When the spring pressed detents 78 override the stops 56, as best seen in FIG. 6, the drawers will be retained in the module when they are pulled to an open position so as to prevent inadvertant spillage of their contents.

The above disclosure has been given by way of illustration and elucidation, and not by way of limitation, and it is desired to protect all embodiments of the herein disclosed inventive concept within the scope of the appended claims.

What is claimed is:

1. A facade frame for forming a drawered cabinet module, said facade frame comprising two horizontally spaced vertically extending end styles defining the lateral extremities of said frame;
   two vertically spaced horizontally extending crosspieces, an upper and lower one, each having ends joined to the ends of said end styles to define the vertical extremities of said frame;
   at least one vertically extending intermediate style positioned between said end styles and having ends, one end joined to an intermediate part of one of said horizontally extending crosspieces, and the other end to an intermediate part of the other of said horizontally extending crosspieces to define drawer entryways into the cabinet module; and
   slideways formed in said styles to facilitate the sliding of a drawer between said styles into the drawer entryway.

2. A facade frame as in claim 1 in which a drawer stop is formed on said frame in at least one of the drawer entryways formed between said styles.

3. A facade frame as in claim 2 in which said drawer stop is formed as a projection upwardly extending from the upper side of the lower crosspiece.

4. A facade frame as in claim 3 in which said drawer stop is formed with a ramped upper surface inclined downwardly towards the front of said frame, whereby upon insertion of a drawer into the drawer opening, the drawer will override the ramp.

5. A facade frame as in claim 1 in which said end styles and crosspieces are each formed with a channel groove therein.

6. A drawered cabinet module employing a facade frame as in claim 5, said module comprising: spaced top, bottom and side walls, each of said walls having a front edge dimensioned to engage in said channel groove in said end styles and crosspieces.

7. A drawered cabinet module as in claim 6 in which a rear wall is secured to the edges of said top bottom and side walls remote from said facade frame.

8. A drawered cabinet module as in claim 6 having drawers dimensioned for insertion into the drawer entryways of said facade frame, each of said drawers comprising: a base element; and slides on said base element extending outwardly into said slidways in said frame.

9. A drawered cabinet module as in claim 6 having a drawer dimensioned for insertion into a drawer entryway of said facade frame, said drawer comprising: a base element; a spring element on said base element; and a detent on said spring element engaging a drawer stop on said frame.

10. A storage cabinet formed of modules as in claim 6, said cabinet comprising a plurality of stacked modules of like horizontal cross-section, with interengaging projections and recesses on abutting facade frames.

11. A storage cabinet as in claim 10 in which at least one of the modules stacked to form the cabinet contains drawers of a size different from that of the drawers of another module, whereby said cabinet can accomodate differently sized articles.

12. A storage cabinet as in claim 10 in which at least one of said modules in the stack forming said cabinet contains drawers dimensioned to accomodate audio tape cassettes; and another of said modules contains drawers dimensioned to accomodate compact discs.

13. A storage cabinet as in claim 12 in which a module is included containing drawers dimensioned to accomodate videotape cassettes.

14. A storage cabinet as in claim 12 in which a module is included containing drawers dimensioned to accomodate game cartridges.

15. A facade frame as in claim 1 in which one of said crosspieces is formed with an engaging projection permitting engagement of an adjacent frame.

16. A facade frame as in claim 15 in which the other of said crosspieces is formed with a recess dimensioned to receive a projection on an adjacent frame.

17. A facade frame as in claim 16 in which said recess is formed in the lower cross piece.

18. A facade frame as in claim 15 in which said engaging projection is formed extending upwardly from the upper crosspiece.

19. A facade frame as in claim 1 in which a rearwardly extending projection is formed on each of said end styles and intermediate styles, and said slidways extend from said styles through said projections.

20. A facade frame as in claim 1 which is formed of a molded plastic material.

* * * * *